United States Patent
Hirai et al.

[11] Patent Number: 6,115,180
[45] Date of Patent: Sep. 5, 2000

[54] OPTICAL MULTILAYERED-FILM FILTER

[75] Inventors: Toshio Hirai; Hiroshi Masumoto; Xinrong Wang; Yoshihiro Someno, all of Miyagi-ken, Japan

[73] Assignee: ALPS Electric Co., Ltd., Tokyo, Japan

[21] Appl. No.: 09/336,418

[22] Filed: Jun. 17, 1999

[30] Foreign Application Priority Data

Jun. 22, 1998 [JP] Japan .................... 10-174652

[51] Int. Cl.[7] .................................................. G02B 5/28
[52] U.S. Cl. .................. 359/586; 359/588; 359/584; 359/580
[58] Field of Search .......................... 359/586, 588, 359/589, 584, 580

[56] References Cited

U.S. PATENT DOCUMENTS 5,410,431  4/1995  Southwell ...................... 359/580
5,475,531  12/1995  Rahmlow et al. .
5,661,602  8/1997  Matsuda et al. .

Primary Examiner—Jon Henry
Attorney, Agent, or Firm—Brinks Hofer Gilson & Lione

[57] ABSTRACT

Described herein is an optical multilayered-film filter which provides less interference and a good optical characteristic and is high in productivity. The optical multilayered-film filter wherein dielectric thin films are stacked on each other in a multilayer form in a single direction, comprises a refractive-index inclined laminated portion in which refractive indices of dielectric thin-film layers are successively inclined and changed in a laminating direction, and an alternately-laminated portion in which a dielectric thin-film layer having a high refractive index and a dielectric thin-film layer having a low refractive index are alternately laminated on each other.

11 Claims, 6 Drawing Sheets

| No | CONSTITUTION (mol:mol) | REFRACTIVE INDEX |
|---|---|---|
| H | $TiO_2$ | 2.435 |
| G | $0.87TiO_2 - 0.13SiO_2$ | 2.333 |
| F | $0.76TiO_2 - 0.24SiO_2$ | 2.170 |
| E | $0.65TiO_2 - 0.35SiO_2$ | 2.068 |
| D | $0.54TiO_2 - 0.46SiO_2$ | 1.942 |
| C | $0.45TiO_2 - 0.55SiO_2$ | 1.830 |
| B | $0.33TiO_2 - 0.67SiO_2$ | 1.714 |
| A | $0.17TiO_2 - 0.83SiO_2$ | 1.582 |
| L | $SiO_2$ | 1.471 |

OPTICAL MULTILAYERED-FILM FILTER

BACKGROUND OF THE INVENTION

1. Field of the Invention

The present invention relates to an optical branching filter for causing light of desired wavelengths to branch off, which is suitable for a wavelength-division multiplexing optical communication, for example, and particularly to an optical multilayered-film filter wherein dielectric thin films different in refractive index from one another are stacked on one another in a multilayer form.

2. Description of the Related Art

The development of wavelength division multiplexing (WDX) has recently been pursued as a new technique corresponding to a leap increase in the capacity of an optical communication. However, there has been a demand for a further increase in the number of wavelength multiplex or multiples. Since light of desired wavelengths are selectively used in such an optical communication, an optical branching filter formed of a dielectric multilayered film in which two to three types of different dielectric thin films are alternately laminated on each other, is utilized.

Such an optical multilayered-film filter will be described below.

FIG. 6 is an explanatory view showing a structure of a conventional optical multilayered film.

When no absorption occurs in the film, a reflection power or reflectivity (R) and an amplitude reflection power rp+1,0 of light incident from a multilayered film corresponding to a p+1 layer on a substrate having a refractive index (n0) have the following relation.

$$R_{p+1,0} = |r_{p+1,0}|^2 \quad (1)$$

With the amplitude reflection power of rp+1,0, the following equation is satisfied.

$$R_{P+1,0} = \frac{\rho_{P+1,P} + r_{P,0}\exp(-i\delta_P)}{1 + \rho_{P+1,P} + r_{P,0}\exp(-i\delta_P)} \quad (2)$$

In the equation, dp and rp+1, p respectively indicate a phase and an amplitude reflection power between the p+1 layer and p layer. The following relation is given:

$$\delta_P = \frac{4\pi}{\lambda} n_P d_P \cos\phi_P \quad (3)$$

l indicates the wavelength of incident light, and np and dp indicate a refractive index of a p layer thin film and the optical thickness thereof respectively. fp indicates a refractive angle of light in the p layer. According to the Fresnel law, the following is given:

$$\rho_{P+1,P} = \frac{u_P - u_{P+1}}{u_P + u_{P+1}} \quad (4)$$

where the following equations are established upon s polarization and p polarization:

$$u_i = n_i \cos \phi_i (i=0,1,2 \ldots) \quad (5)$$

$$u_i = n_i/\cos \phi_i (i=0,1,2 \ldots) \quad (5)$$

A graphical method and an analytical synthetic method have heretofore been used to optimize a laminated structure of the optical multilayered film with respect to an arbitrary optical characteristic. It has been recently common practice to perform automatic calculations using a personal computer.

A further description will next be made of such a conventional optical multilayered-film filter with reference to FIGS. 7A, 7B and FIG. 3. FIG. 7A is a diagram showing the relationship between the number of layers and a refractive index for an optical multilayered-film filter in which dielectric thin films having high and low refractive indices are alternately stacked on each other. FIG. 7B is a diagram showing the result of calculation of a transmission characteristic for the optical multilayered film filter shown in FIG. 7A. FIG. 3 is a diagram illustrating a material of a film and an index of refraction thereof.

Such a conventional optical multilayered-film filter shown in FIG. 7A is formed by alternately laminating a high-refractive index dielectric thin film H and a low-refractive index dielectric thin film L on one another. Here, H and L denote $TiO_2$ and $SiO_2$ films having optical characteristics shown in FIG. 3, respectively. Upon calculation of a transmission spectrum, an incident angle of light was defined as 0 (vertical incidence) and a center wavelength thereof was defined as 730 nm. While the conventional optical multilayered-film filter has a reflection power of approximately 100% in a reflection band having the center wavelength (730 nm), it has a problem in that many interference peaks exist in a transmission band. It was therefore difficult to obtain a high-accuracy optical filter.

On the other hand, a rugate filter having a structure in which a refractive index relative to the direction of the thickness of each dielectric thin film is continuously and periodically varied according to a since function or the like, has been known as one for improving the optical characteristic of the aforementioned conventional optical multilayered-film filter.

The rugate filter illustrated as the second conventional example will be explained with reference to FIGS. 8A and 8B. FIG. 8A is a diagram showing the number of layers and a refractive index for the rugate filter, and FIG. 8B is a diagram showing the result of calculation of a transmission spectrum of the rugate filter shown in FIG. 8A, respectively. In order to make a comparison with the configuration of the optical multilayered-film filter in which the aforementioned high and low refractive-index thin films are alternately stacked on each other, the relationship between the refractive index and the number of films laminated was illustrated in FIG. 8A with the thickness corresponding to one cycle of the sine wave being regarded as two layers of alternate multilayered films. The dependency of the refractive index (n) of the rugate filter on the optical thickness (x) thereof can be given by the following equation:

$$n(X) = n_o + n_1 \sin(2\pi X/P) \quad (7)$$

where n0 and n1 indicate an average refractive index and the amplitude of a change in refractive index respectively, and P indicates the thickness in one sine cycle. As shown in FIG. 8A, the rugate filter has a structure in which the refractive index continuously and periodically varies in its thickness direction according to the since function.

As is apparent from FIG. 8B, the rugate filter restrains the interference in a transmission region and decreases even a harmonic reflection peak of a low wavelength range as compared with the optical multilayered-film filter in which the high-refractive index layers are alternately stacked on each other, but cannot eliminate a reflection peak lying in the vicinity of a reflection band.

Therefore, the rugate filter needs other functions for adjusting or controlling its optical characteristic upon filter design to solve the interference peak in the vicinity of the reflection band. For instance, the quintic function and the Fourier function or the like are added to the structure of the rugate filter to thereby allow an improvement in the optical characteristic of a broadband reflection filter. Since, however, the configuration of the filter becomes extremely complex, the fabrication thereof is made more difficult.

As described above, the conventional optical multilayered-film filter in which the high-refractive index film and the low-refractive index film are alternately laminated on each other, has a problem in that it is difficult to satisfy required performance such as a narrow band width, stability with respect to a change in temperature, etc.

Further, the rugate filter has a problem in that the configuration thereof is complex, the control for continuously varying the refractive index in accordance with the designed values and forming the film with high accuracy is difficult, its productivity is low, and it is difficult to provide the rugate filter with stable quality and at low cost.

SUMMARY OF THE INVENTION

An object of the present invention is to solve the problems of the conventional examples and provide an optical multilayered-film filter which is reduced in interference and excellent in optical characteristic.

Another object of the present invention is to provide an optical multilayered-film filter high in productivity.

As means for solving the above-described problems, there is provided an optical multilayered-film filter according to the present invention, wherein dielectric thin films are multilayered in a single direction, comprising a refractive-index inclined laminated portion in which refractive indices of dielectric thin-film layers are successively inclined and changed in a laminating direction, and an alternately-laminated portion in which a dielectric thin-film layer having a high refractive index and a dielectric thin-film layer having a low refractive index are alternately laminated on each other.

As means for solving the above-described problems, there is provided an optical multilayered-film filter according to the present invention, wherein the index inclined laminated portion is formed in plural form so as to be interposed in the laminating direction of the alternately-laminated portion.

As means for solving the above-described problems, there is provided an optical multilayered-film filter according to the present invention, wherein dielectric thin films are multilayered in a single direction, comprising a refractive-index inclined laminated portion in which refractive indices of dielectric thin-film layers are successively inclined and changed in a laminating direction, an alternately-laminated portion in which a dielectric thin-film layer having a high refractive index and a dielectric thin-film layer having a low refractive index are alternately laminated on each other, and a refractive-index difference control portion provided between the laminated portions.

As means for solving the above-described problems, there is provided an optical multilayered-film filter according to the present invention, wherein the refractive-index difference control portion is formed by a plurality of single refractive-index films different from one another.

As means for solving the above-described problems, there is provided an optical multilayered-film filter according to the present invention, wherein dielectric thin films are multilayered in a single direction, comprising a first refractive-index inclined laminated portion in which dielectric thin films are stacked on one another in a multilayer form so that refractive indices successively increase in a stepwise form, an alternately-laminated portion in which a dielectric thin-film layer having a high refractive index and a dielectric thin-film layer having a low refractive index are alternately laminated on each other, and a second refractive-index inclined laminated portion in which dielectric thin films are stacked on one another in a multilayer form so that refractive indices successively decrease in a stepwise form, and wherein the first refractive-index inclined laminated portion, the alternately-laminated portion and the second refractive-index inclined laminated portion are formed in that order.

As means for solving the above-described problems, there is provided an optical multilayered-film filter according to the present invention, wherein a refractive-index difference control portion composed of single refractive-index films formed with desired refractive indices by causing $SiO_2$ to $TiO_2$ to differ in composition ratio is provided between the refractive-index inclined laminated portion and the alternately-laminated portion.

As means for solving the above-described problems, there is provided an optical multilayered-film filter according to the present invention, wherein the refractive-index inclined laminated portion is formed by single refractive-index films formed with desired refractive indices by causing $SiO_2$ and $TiO_2$ to differ in composition ratio.

When films thin enough for the wavelength of control light are stacked on each other, the control light does not recognize the films as a laminated film and responds to the same as an equivalent single refractive-index film corresponding to a laminated structure. An optical branching filter can be obtained which has a characteristic continuously changed in a film-thickness direction by changing a laminated structure of two types of different refractive-index films through the use of this property.

In order to obtain a film having an arbitrary refractive index by controlling a composition ratio of two types of different materials in a single film, a film-forming method having high film controllability, such as helicon sputtering or the like is used, whereby a single optical film having a desired refractive index can be stably formed.

Paying attention to the above-described point of view, an optical multilayered-film filter according to the present invention is formed to take a structure provided with a refractive-index inclined laminated portion in which refractive indices of dielectric thin films are inclined and changed in a laminating direction, and a high and low refractive-index alternately-laminated portion.

The optical multilayered-film filter according to the present invention also takes a configuration of an optical multilayered film which combines a refractive-index difference control portion lying between the above laminated portions with the above configuration.

Further, the optical multilayered-film filter according to the present invention is constructed in such a manner that the refractive-index difference control portion is formed of a plurality of different single refractive-index films.

Moreover, the optical multilayered-film filter according to the present invention is constructed in such a manner that the refractive-index inclined laminated portion or the refractive-index difference control portion is formed by single refractive-index films formed with desired refractive indices by causing SiO2 and $TiO_2$ to differ in composition ratio.

According to the optical multilayered-film filter constructed in this manner, the higher degree of freedom of the design of an optical characteristic can be ensured while the reproducibility and controllability at the film formation are being ensured. It is also possible to provide an optical multilayered-film filter which provides less interference and a good optical characteristic and is high in productivity.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DESCRIPTION OF THE PREFERRED EMBODIMENTS

Figure 1A:
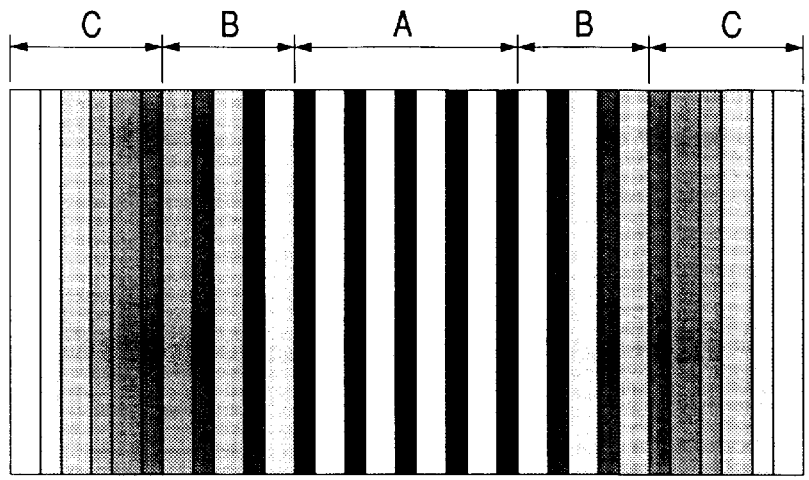
FIGS. 1A and 1B are diagrams for describing the relationship between a refractive index and optical thickness of an optical multilayered-film filter according to an embodiment of the present invention, and a cross-sectional structure of the optical multilayered-film filter, respectively;.
Figure 1B:
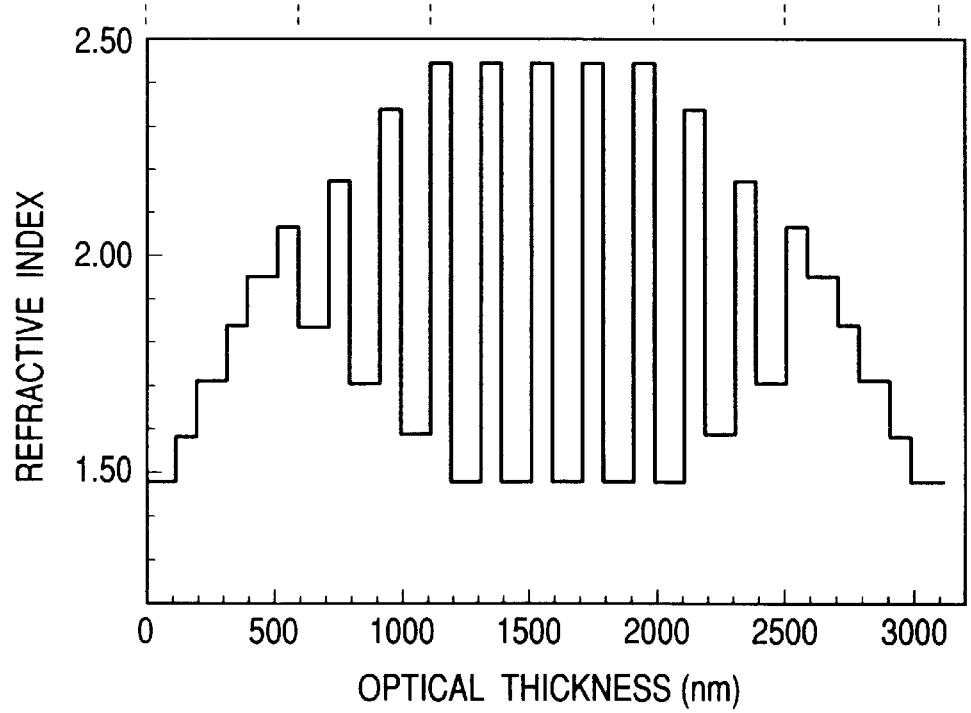

Preferred embodiments of the present invention will hereinafter be described with reference to the accompanying drawings. FIG. 1A is a diagram showing the relationship between a refractive index and optical thickness of an optical multilayered-film filter according to one embodiment of the present invention, and FIG. 1B is an explanatory view showing the concept of its cross-sectional structure, respectively.

The optical multilayered-film filter according to the present invention is an optical multilayered-film filter in which dielectric thin films are laminated on one another in multilayered form in a single direction. The optical multilayered-film filter is constructed so as to have a refractive-index inclined laminated portion C in which refractive indices of dielectric thin-film layers are successively inclined and changed in a film-laminating direction, and an alternately-laminated portion A in which a dielectric thin-film layer having a high refractive index and a dielectric thin-film layer having a low refractive index are alternately laminated on each other.

Further, the optical multilayered-film filter has a portion B for adjusting or controlling the difference in refractive index between the portion A and the portion C and takes a film structure formed in order of the refractive-index inclined laminated portion C, refractive-index difference control portion B, alternately-laminated portion A, refractive-index difference control portion B and refractive-index inclined laminated portion C with respect to the film laminating direction as viewed from a substrate.

Figure 2A:
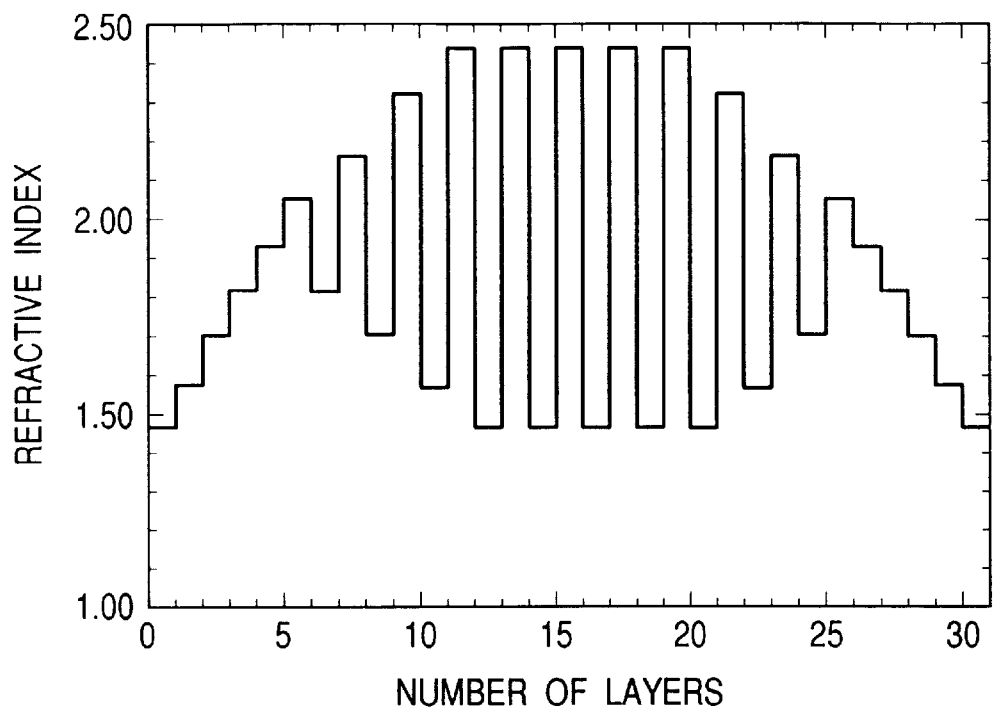
FIGS. 2A and 2B are explanatory diagrams illustrating the relationship between the number of layers and a refractive index for a broadband reflecting filter according to an embodiment of the present invention, and the result of calculation of a transmitted spectrum employed in the broadband reflecting filter, respectively.
Figure 2B:
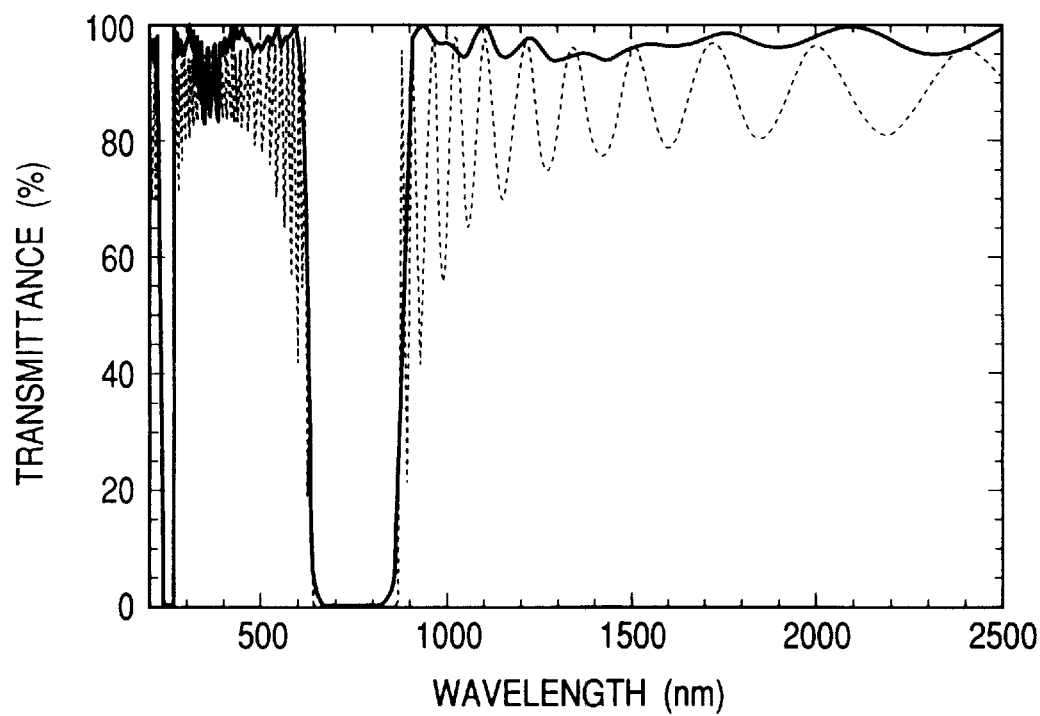
Figures 3, 4:
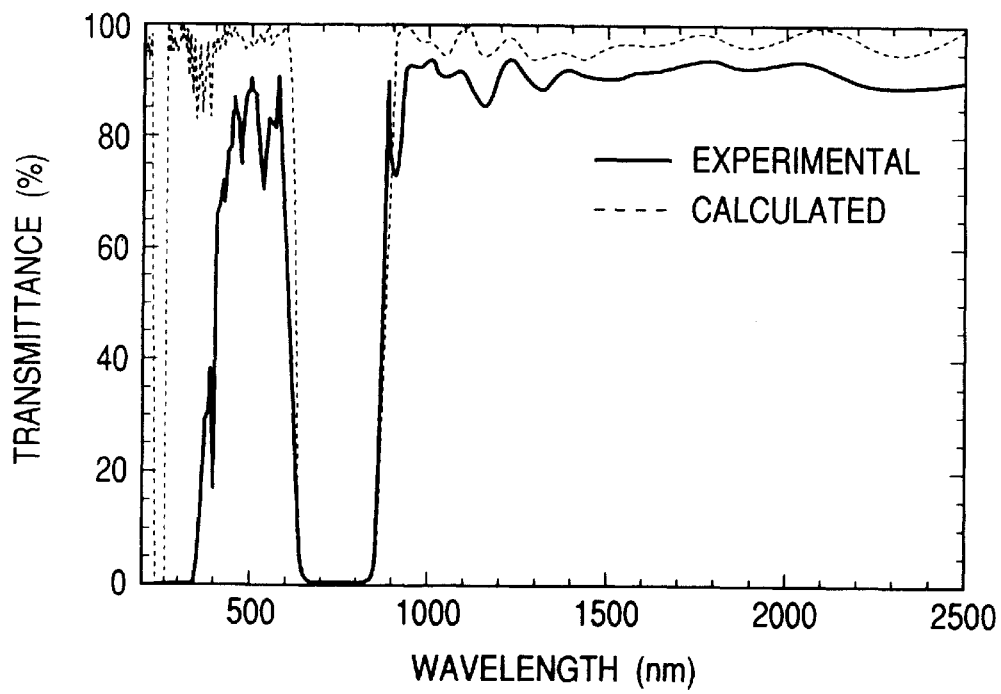
FIG. 3 is a diagram showing a material of a film and an index of refraction thereof.
FIG. 4 is an explanatory diagram illustrating calculated curves of transmission spectrums and experimental values which are obtained in the broadband reflection filter according to the embodiment of the present invention.

A broadband reflection filter illustrated as one embodiment of the present invention will next be explained with reference to FIGS. 2A and 2B and FIGS. 3 and 4. FIG. 2A is a diagram showing the relationship between the number of layers and a refractive index related to the broadband reflection filter according to the embodiment of the present invention. A solid line in FIG. 2B shows the result of calculation of a transmitted spectrum in the broadband reflection filter shown in FIG. 2A. FIG. 3 is a diagram showing the material of a film and an index of refractive thereof. FIG. 4 is a diagram showing a calculated curve of a transmitted spectrum in the broadband reflection filter according to the embodiment of the present invention and experimental values.

The broadband reflection filter illustrated as one embodiment of the present invention comprises a broadband reflection filter composed of 31 layers, which is designed with $SiO_2$ and $TiO_2$ as materials. Described more specifically, the respective dielectric thin-film layers are layered and constructed as follows:

LABCDECFBGAH(LH)$^4$LGAFBEDCBAL where L, H, A, B, C, D, E, F and G respectively indicate $SiO_2$—$TiO_2$ composite films having an optical film thickness (nd=λ/4), which are shown in FIG. 3. LABCDE and EDCBAL indicate a laminated layer composed of $SiO_2$—$TiO_2$ composite films whose refractive indices are inclined symmetrically (this corresponds to a refractive-index inclined laminated portion C illustrated in the explanatory view of FIG. 1).

Further, portions corresponding to CFBGA and LGAFB indicate a high-low refractive index alternately-laminated layer composed of $SiO_2$—$TiO_2$ composite films (this corresponds to a refractive-index difference control portion B illustrated in the explanatory view of FIG. 1). Thus, the index difference control portion is formed of a plurality of different single refractive-index films (preferably four or more kinds of refractive-index films).

Further, the index inclined laminated portion and index difference control portion are respectively formed of single refractive-index films formed with desired refractive indices by causing $SiO_2$ and $TiO_2$ to differ in composition ratio respectively as shown in FIG. 3.

Further, H(LH)$^4$ located in the center of the above laminated layer is a layer obtained by alternately laminating a dielectric thin-film layer having a high refractive index, which is formed of a single layer film of $TiO_2$ and $SiO_2$, and a dielectric thin-film layer having a low refractive index, which is formed of the single layer (This layer correspond to an alternately-laminated portion A illustrated in the explanatory view of FIG. 1). The design thickness of the layer is 3119 nm.

The so-designed broadband reflection filter according to one embodiment of the present invention is fabricated and experimented by helicon sputtering. The helicon sputtering is a method of providing induced discharging coil on a magnetron cathode to generate a helicon wave, thereby performing sputtering using an excited plasma. It is therefore possible to perform a low plasma damage and form a high-density multicomponent film with accuracy. Two helicon cathodes are used in a helicon sputtering device. A target composed of fused silica (99.99%) and sintered titanium oxide (99.5%) is attached to the helicon cathodes respectively. A power of rf (13.56MHz) is applied to the target and an induction coil and the power is set so as to range from 0W to 200W. The basic pressure of a chamber at the film formation is set to less than or equal to $5\times10-5Pa$. The ratio between Argon and oxygen gas introduced into the cathode and a radical gun is set to Ar/O2=2/1, and the pressure for the film formation is set to $1.8 \times10-1Pa$. The distance between a substrate and the target is defined as 180 nm and the substrate is rotated at 10rpm. Optical glass (BK7, n=1.52) and an Si(100) single crystal substrate were used as the substrate. The thickness of a film and the refractive index thereof were measured by an ellipsometer (Gaertner L116-B, 633 nm). The texture of the film was observed by TEM (JEOL-200FX). The transmittance of a multilayered film was measured by a spectrophotometer (Shimadzu UV-3101-200FX) over a wavelength range from 200 nm to 2500 nm.

A cross-sectional structure of the optical multilayered film created by these, according to the embodiment of the present invention was observed. As a result, the sectional structure has coincided with that shown in FIG. 1. Although not shown in the drawing, a TEM photograph shows a tendency to decrease the brightness or lightness of a bright field image according to an increase in refractive index of each layer, i.e., an increase in $TiO_2$ content in each layer. From XRD, SEM and TEM analyses of $SiO_2$, $TiO_2$ and a $SiO_2$—$TiO_2$ composite film, a micro-fabricated structure of the $SiO_2$—$TiO_2$ composite film is an amorphous film containing a homogeneous and isotropic amorphous film and a nanocrystal $TiO_2$. This structure is regarded as a film structure ideal as an optical multilayered-film filter having no polarization dependency or the like and homogeneous on an optical basis.

A transmitted spectrum of the multilayered film obtained from the result of evaluation of an optical characteristic has a center wavelength of 730 nm and a reflectivity or reflection power of 99.8% and substantially coincided with the calculated curve. Further, FWHM (full width at half maximum) substantially coincided with the designed value.

In FIG. 2B, the calculated transmitted spectrum of the broadband reflection filter according to the aforementioned embodiment of the present invention is indicated by the solid line. Further, the calculated transmission spectrum of the multilayered-film filter composed of the 31-layer $TiO_2$/$SiO_2$ alternately-laminated layer illustrated in the conventional example is indicated by a broken line for comparison.

It is understood from FIG. 2B that as compared with the optical multilayered-film filter according to the conventional example, the broadband reflection filter according to the embodiment of the present invention has less interference in a transmission band and is capable of obtaining an optical characteristic more excellent for the broadband reflection filter.

It is also understood that as compared with the transmission spectrum of the rugate filter shown in FIG. 2B as another conventional example, the interference in the transmission band is further restrained as viewed from the rugate filter.

Thus, the broadband reflection filter according to the embodiment of the present invention is capable of limiting interference and obtaining a high optical characteristic. Since the broadband reflection filter can take a simple film configuration as compared with the rugate filter, the reproducibility and controllability of the formed film can be ensured. Thus, an optical multilayered-film filter high in productivity can be provided.

Figure 5:
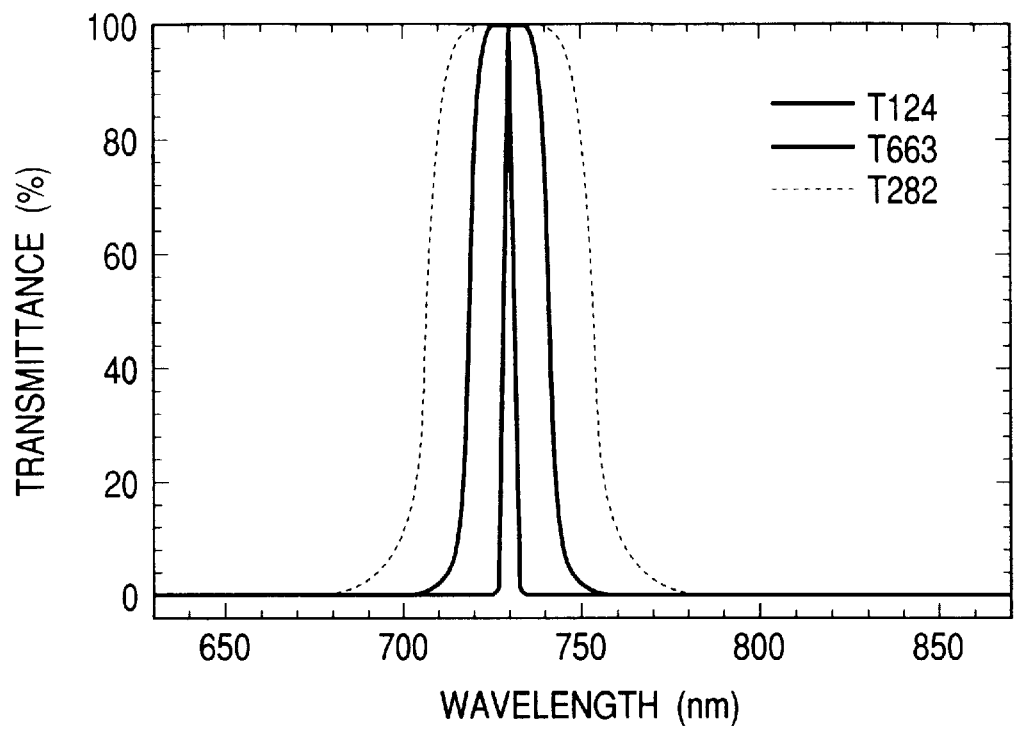
FIG. 5 is an explanatory diagram showing the result of calculation of each transmitted spectrum, which is obtained in a narrow band transmission filter according to an embodiment of the present invention.
Figure 6:
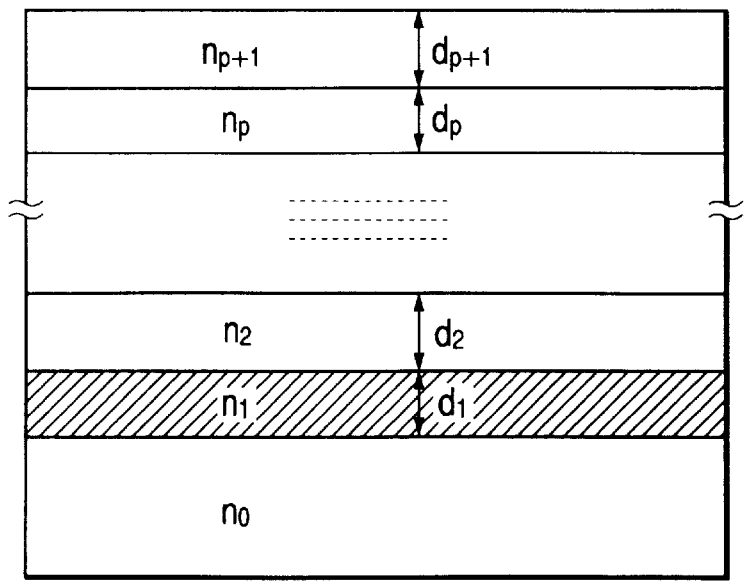
FIG. 6 is an explanatory diagram depicting a structure of a conventional optical multilayered film.
Figure 7A:
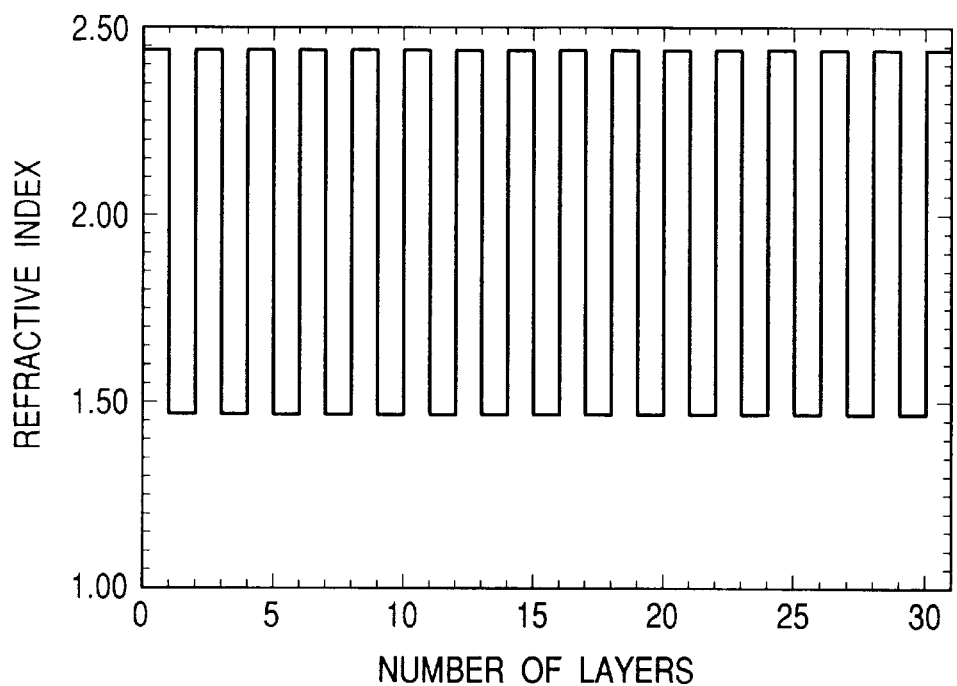
FIGS. 7A and 7B are explanatory diagrams showing the relationship between the number of layers and a refractive index for an alternately-laminated multilayered-film filter according to a conventional example, and the result of calculation of transmitted characteristics thereof respectively.
Figure 7B:
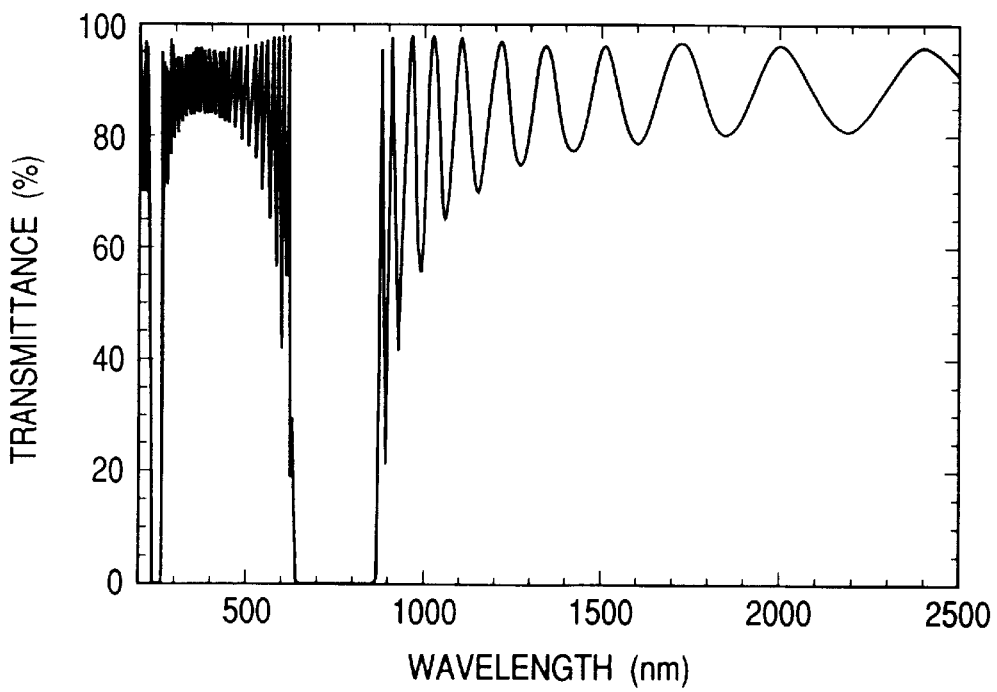
Figure 8A:
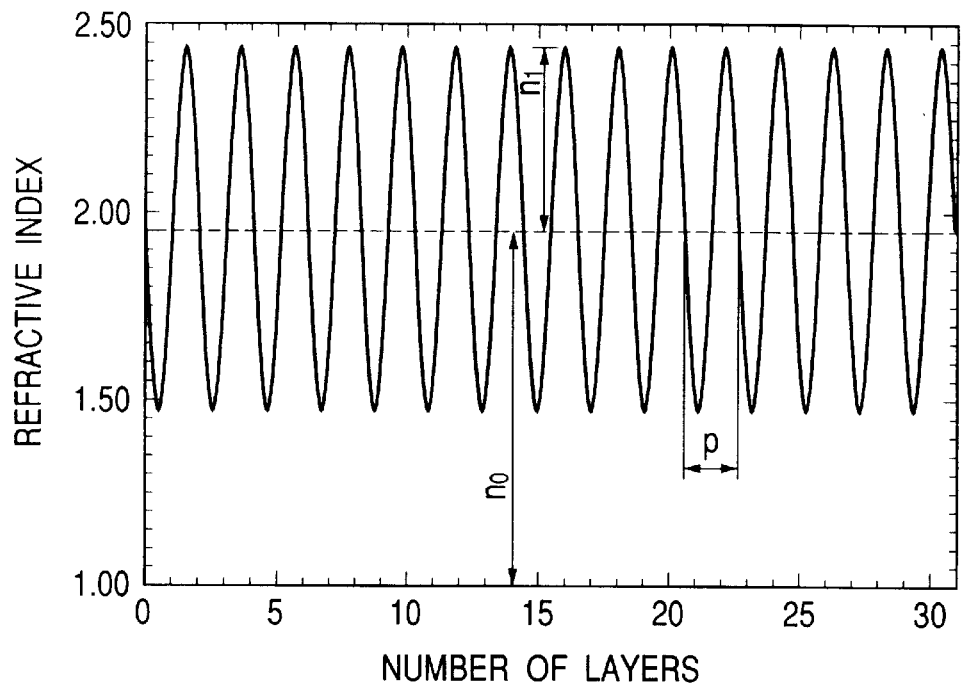
Figs. 8A and 8B are explanatory diagrams illustrating the relationship between the number of layers and an index of refraction for a rugate filter according to a conventional example, and the result of calculation of a transmitted spectrum thereof, respectively.
Figure 8B:
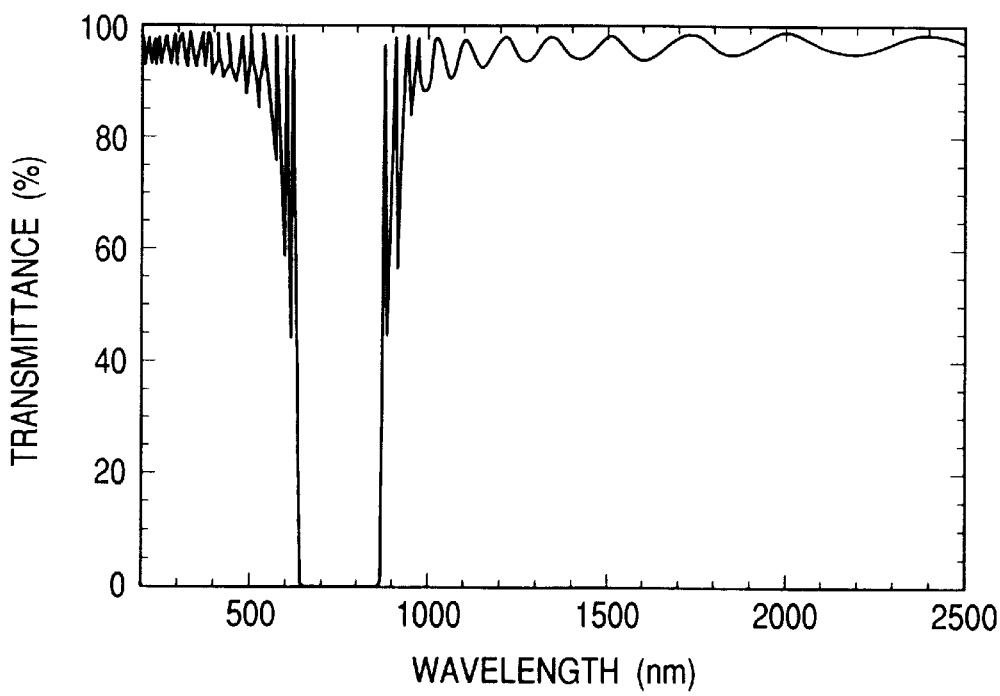

A narrowband transmission filter illustrated as another embodiment of the present invention will next be described with reference to FIG. 5. FIG. 5 is a diagram showing the result of calculation of a transmission spectrum of the narrowband transmission filter according to the embodiment of the present invention.

The narrowband transmission filter illustrated as another embodiment of the present invention is also constructed so as to have a refractive-index inclined laminated portion in which refractive indices of dielectric thin-film layers are successively inclined and changed in a film-laminating direction, and an alternately-laminated portion in which a dielectric thin-film layer having a high refractive index and a dielectric thin-film layer having a low refractive index are alternately laminated on each other. Described more specifically, the respective dielectric thin-film layers are layered and constructed as follows:

LABCDECFBGAxH(LH)$^n$LyH(LH)$^n$xHLGAFBED CBAL where curves T124, T663 and T282 in FIG. 5 respectively correspond to parameters of x=1, y=2, n=4, x=6, y=6, n=3, x=2, y=8 and n=2. The respective films are composed of the materials shown in FIG. 3 and have the refractive indices, respectively.

It is understood that as is apparent from FIG. 5, the narrowband transmission filter according to the embodiment of the present invention can obtain a transmittance of approximately 100% at a center wavelength of 730 nm and a reflectivity or reflection power of approximately 100% in a reflection region. Further, the adjustment of the aforementioned parameters of multilayered film makes it possible to control a wavelength range of a transmission band width to 1 nm to 50 nm, and a high optical characteristic can be obtained as for the narrowband transmission filter.

According to the present invention, as has been described above, each embodiment is layered so as to have a refractive-index inclined laminated portion in which refractive indices of dielectric thin-film layers are successively inclined and changed in a film-laminating direction, and an alternately-laminated portion in which a dielectric thin-film layer having a high refractive index and a dielectric thin-film layer having a low refractive index are alternately laminated on each other. Therefore, an optical multilayered-film filter having less interference and excellent in optical characteristic can be provided. It is also possible to provide an optical multilayered-film filter high in productivity.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An optical multilayered-film filter wherein dielectric thin films are stacked on each other in a multilayer form in a single direction, comprising:

a refractive-index laminated portion comprising at least three contiguous layers of dielectric thin film that have consecutive step increases in refractive indices; and an alternatively-laminated portion in which a dielectric thin-film layer having a high refractive index and a dielectric thin-film layer having a low refractive index are alternately laminated on each other.

2. The optical multilayered-film filter according to claim 1, wherein said refractive-index laminated portion is comprised of more than three layers of dielectric thin film and underlies said alternatively-laminated portion.

3. An optical multilayered-film filter wherein dielectric thin films are multilayered in a single direction, comprising:
   a refractive-index laminated portion comprising at least three contiguous layers of dielectric thin film that have a consecutive step increase in refractive indices;
   an alternately-laminated portion in which a dielectric thin-film layer having a high refractive index and a dielectric thin-film layer having a low refractive index are alternately laminated on each other; and
   a refractive-index difference control portion provided between said refractive-index laminated portion and said alternately-laminated portion.

4. The optical multilayered-film filter according to claim 3, wherein said refractive-index difference control portion comprises a plurality of single refractive-index films different from one another.

5. The optical multilayered-film filter according to claim 3, wherein a refractive-index difference control portion composed of single refractive-index films formed with desired refractive indices by causing $SiO_2$ to $TiO_2$ to differ in composition ratio is provided between said refractive-index laminated portion and said alternately-laminated portion.

6. An optical multilayered-film filter wherein dielectric thin films are multilayered in a single direction, comprising:
   a first refractive-index laminated portion in which at least three dielectric thin films are stacked on one another in a multilayer contiguous form so that refractive indices of said dielectric thin films successively increase in a stepwise form;
   an alternately-laminated portion in which a dielectric thin-film layer having a high refractive index and a dielectric thin-film layer having a low refractive index are alternately laminated on each other; and
   a second refractive-index laminated portion in which dielectric thin films are stacked on one another in a multilayer form so that refractive indices successively decrease in a stepwise form, said first refractive-index laminated portion, said alternately-laminated portion and said second refractive-index laminated portion are formed in that order.

7. The optical multilayered-film filter according to claim 6, wherein a refractive-index difference control portion is formed between said refractive-index laminated portion and said alternately-laminated portion.

8. The optical multilayered-film filter according to claim 6, wherein a refractive-index difference control portion composed of single refractive-index films formed with desired refractive indices by causing $SiO_2$ and $TiO_2$ to differ in composition ratio is provided between said refractive-index laminated portion and said alternately-laminated portion.

9. The optical multilayered-film filter according to claim 1, wherein said refractive-index laminated portion is formed by single refractive-index films formed with the desired refractive indices by causing $SiO_2$ and $TiO_2$ to differ in composition ratio.

10. The optical multilayered-film filter according to claim 3, wherein said refractive-index laminated portion is formed by single refractive-index films formed with the desired refractive indices by causing $SiO_2$ and $TiO_2$ to differ in composition ratio.

11. The optical multilayered-film filter according to claim 6, wherein said refractive-index laminated portion is formed by single refractive-index films formed with the desired refractive indices by causing $SiO_2$ and $TiO_2$ to differ in composition ratio.

* * * * *